(12) United States Patent
Lin et al.

(10) Patent No.: US 10,796,126 B2
(45) Date of Patent: Oct. 6, 2020

(54) FINGERPRINT SENSING DEVICE

(71) Applicant: AU OPTRONICS CORPORATION, Hsin-Chu (TW)

(72) Inventors: Wu-Wei Lin, Hsin-Chu (TW); Jui-Chi Lo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/221,672

(22) Filed: Dec. 17, 2018

(65) Prior Publication Data
US 2019/0188440 A1 Jun. 20, 2019

(30) Foreign Application Priority Data
Dec. 19, 2017 (TW) .............................. 106144640 A

(51) Int. Cl.
*G06K 9/00* (2006.01)
*G06F 3/044* (2006.01)
*G06F 3/041* (2006.01)

(52) U.S. Cl.
CPC .......... *G06K 9/0002* (2013.01); *G06F 3/044* (2013.01); *G06F 3/0416* (2013.01)

(58) Field of Classification Search
CPC ...... G06K 9/0002; G06F 3/0416; G06F 3/044
See application file for complete search history.

(56) References Cited

U.S. PATENT DOCUMENTS

| | | | |
|---|---|---|---|
| 9,461,826 B2 | 10/2016 | Kreft | |
| 2005/0184965 A1* | 8/2005 | Geaghan | G06F 3/045 345/173 |
| 2007/0024546 A1* | 2/2007 | Jang | G06K 9/0002 345/78 |
| 2013/0135330 A1* | 5/2013 | Choi | G09G 3/3648 345/545 |
| 2015/0109548 A1 | 4/2015 | Kim et al. | |
| 2016/0062505 A1 | 3/2016 | Hwang et al. | |
| 2016/0314332 A1 | 10/2016 | Lee et al. | |
| 2017/0277931 A1* | 9/2017 | Uehara | G02F 1/13338 |

FOREIGN PATENT DOCUMENTS

| | | |
|---|---|---|
| CN | 104571752 | 4/2015 |
| CN | 106462752 | 2/2017 |

* cited by examiner

*Primary Examiner* — Stephen G Sherman
(74) *Attorney, Agent, or Firm* — WPAT, PC

(57) ABSTRACT

A fingerprint sensing device comprises a plurality of sensing pads, a plurality of data lines, a shielding layer, and a plurality of auxiliary voltage lines. The data lines are separately and electrically connected to the sensing pads, and configured to provide a sensing voltage to the sensing pads. The shielding layer is disposed between the sensing pad and the data lines. The auxiliary voltage lines are separately and electrically connected to the sensing pads, configured to provide an auxiliary voltage to the sensing pads. The auxiliary voltage is different from the sensing voltage. When a first sensing pad receives the sensing voltage, a second sensing pad adjacent to the first sensing pad receives the auxiliary voltage.

18 Claims, 15 Drawing Sheets

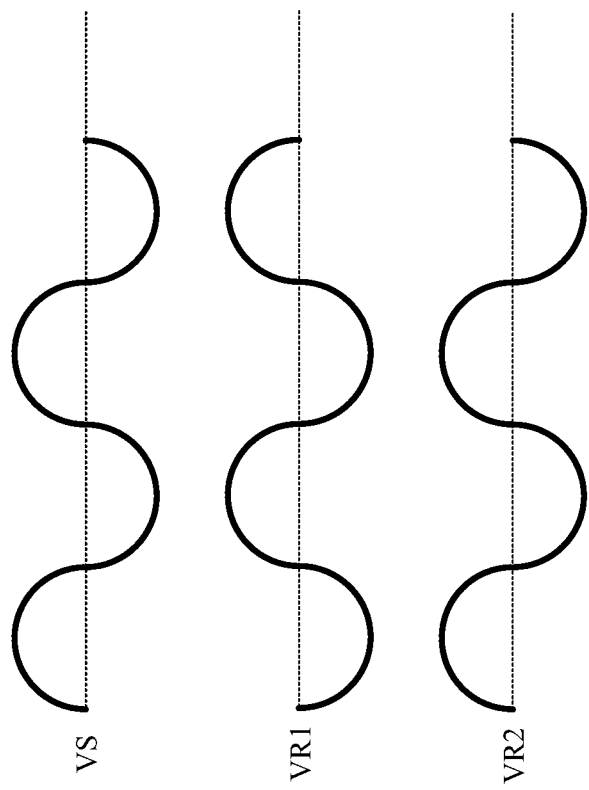

FINGERPRINT SENSING DEVICE

RELATED APPLICATIONS

This application claims priority to Taiwan Application Serial Number 106144640, filed Dec. 19, 2017, which is herein incorporated by reference.

BACKGROUND

Technical Field

The present disclosure relates to an electronic device. More particularly, the present disclosure relates to a fingerprint sensing device.

Description of Related Art

With advances in technology, fingerprint sensing devices are being increasingly used in our daily lives.

A typical capacitive type fingerprint sensing device can include a plurality of sensing pads. The fingerprint sensing device can detect the fingerprint by detecting the capacitance formed between the finger and the sensing pads. However, there are parasitic capacitances in the fingerprint sensing device, so that the sensation of fingerprint may be affect. Therefore, an important area of research in this field involves ways to improve the quality of the fingerprint sensing.

SUMMARY

One aspect of the present disclosure is related to a fingerprint sensing device. In accordance with one embodiment of the present disclosure, the fingerprint sensing device includes a plurality of sensing pads, a plurality of data lines, a shielding layer, and a plurality of auxiliary voltage lines. The sensing pads are arranged in an array, in which the sensing pads include a first sensing pad and a second sensing pad adjacent to each other. The data lines are respectively and electrically connected to the sensing pads, and configured to provide a sensing voltage to the sensing pads. The shielding layer is disposed between the sensing pads and the data lines. The auxiliary voltage lines are respectively and electrically connected to the sensing pads and configured to provide an auxiliary voltage to the sensing pads, in which the auxiliary voltage and the sensing voltage are different from each other. Under a condition that the first sensing pad receives the sensing voltage, the second sensing pad receives the auxiliary voltage.

Another aspect of the present disclosure is related to a fingerprint sensing device. In accordance with one embodiment of the present disclosure, the fingerprint sensing device includes a plurality of sensing pads and a plurality of control circuits. The sensing pads are arranged in an array. The control circuits are arranged in an array and electrically connected to the sensing pads respectively. One of the control circuits includes a first switch, a second switch, a third switch, and a fourth switch. The first switch is electrically connected to a first sensing pad of the sensing pads, the first switch configured for receiving a sensing voltage and turning on corresponding to a first scan signal to provide the sensing voltage to the first sensing pad. The second switch is electrically connected to the first sensing pad, the second switch configured for turning on corresponding to the first scan signal, in which the first switch and the second switch are alternately turned on. The third switch is electrically connected to the second switch, the third switch configured for receiving an auxiliary voltage and turning on corresponding to a second scan signal to provide the auxiliary voltage to the first sensing pad through the second switch. The fourth switch is configured for turning on corresponding to the second scan signal to provide an operating voltage to the first sensing pad through the second switch, in which the third switch and the fourth switch are alternately turned on.

Through application of one embodiment described above, interference between the data lines and the touch pads can be reduced, and thus the quality of fingerprint sensing can be improved.

BRIEF DESCRIPTION OF THE DRAWINGS

The invention can be more fully understood by reading the following detailed description of the embodiments, with reference made to the accompanying drawings as follows:

FIG. 3B illustrates different voltages according to one embodiment of the present disclosure.

DETAILED DESCRIPTION

Figure 1A:
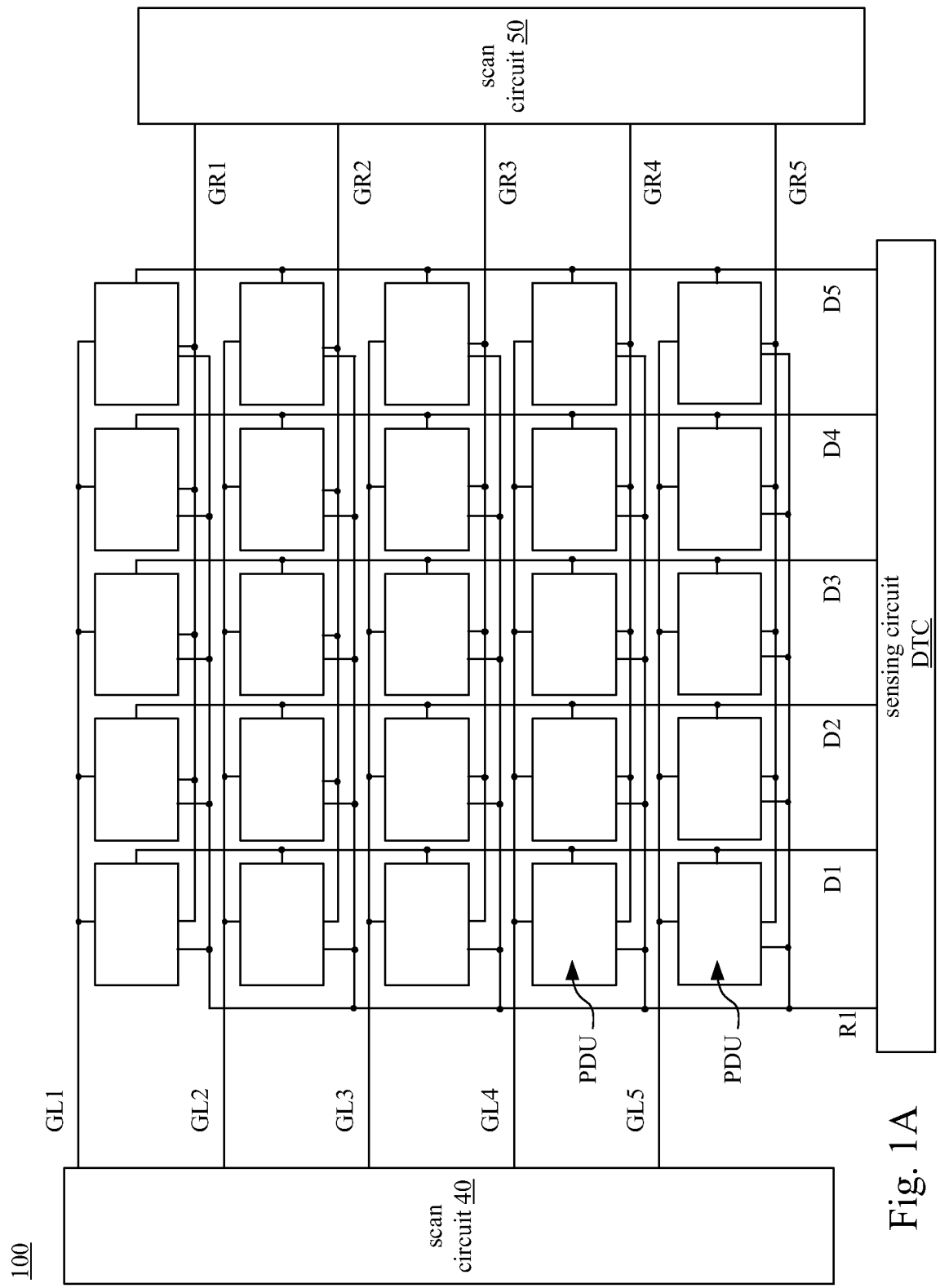
FIG. 1A is a schematic diagram of a fingerprint sensing device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, although the terms "first," "second," etc. may be used to describe various elements, these elements should not be limited by these terms. These terms are only used to distinguish one element from another.

For example, a first element could be termed a second element, and, similarly, a second element could be termed a first element, without departing from the scope of the embodiments.

It will be understood that, in the description herein and throughout the claims that follow, when an element is referred to as being "electrically connected" or "electrically coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, the meaning of "a," "an," and "the" includes reference to the plural unless the context clearly dictates otherwise.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1A is a schematic diagram of a fingerprint sensing device 100 according to one embodiment of the present disclosure. In an embodiment, the fingerprint sensing device 100 may include a scan circuit 40, a scan circuit 50, a sensing circuit DTC, data lines D1-D5, scan lines GL1-GL5, scan lines GR1-GR5 (also referred to as control lines), auxiliary voltage line R1, and sensing units PDU. It should be noted that the number of signal lines and components described above is only an example, and the disclosure is not limited thereto.

In one embodiment, the scan circuit 40 is electrically connected to the sensing units PDU through the scan lines GL1-GL5, configured to provide the scan signals SGL1-SGL5 to the sensing units PDU respectively through the scan lines GL1-GL5, to turn on the sensing switches (e.g., the switch TR1 in FIG. 2) of the sensing units PDU row by row.

In one embodiment, the scan circuit 50 is electrically connected to the sensing units PDU through the scan lines GR1-GR5, configured to provide the scan signals SGR1-SGR5 to the sensing units PDU respectively through the scan lines GR1-GR5, to turn on the control switches (e.g., the switch TR3 in FIG. 2) of the sensing units PDU.

In one embodiment, the sensing circuit DTC is electrically connected to the sensing units PDU through the data lines D1-D5, configured to provide a sensing voltage VS to a row of the sensing units PDU with the sensing switches thereof turning on through the data lines D1-D5, and receives response signals from these sensing units PDU through the data lines D1-D5.

In one embodiment, the sensing circuit DTC is also electrically connected to the sensing units PDU through the auxiliary voltage lines R1, configured to provide an auxiliary voltage VR1 to a row of the sensing units PDU with the control switches thereof turning on through the auxiliary voltage lines R1. In one embodiment, the auxiliary voltage VR1 may be provided to these sensing units PDU through the auxiliary voltage lines R1 by another circuit independent from the sensing circuit DTC. In one embodiment, the auxiliary voltage lines R1 providing the auxiliary voltage VR1 to different sensing units PDU are connected to each other.

In an embodiment, the sensing units PDU are arranged in a matrix. Each sensing unit PDU is electrically connected to one of the data lines D1-D5, one of the scan lines GL1-GL5, one of the scan lines GR1-GR5, and one of the auxiliary voltage lines R1. In an embodiment, the sensing unit PDU includes a sensing pad PD and a control circuit (e.g., a control circuit CTC in FIG. 2). The sensing pads PD of the sensing units PDU are also arranged in a matrix. The control circuit is used to selectively provide different voltages to the sensing pad PD corresponding to the scan signals SGL1-SGL5 and the scan signals SGR1-SGR5 for sensing fingerprints. Details of fingerprint sensation will be described in the paragraphs below.

Figure 1B:
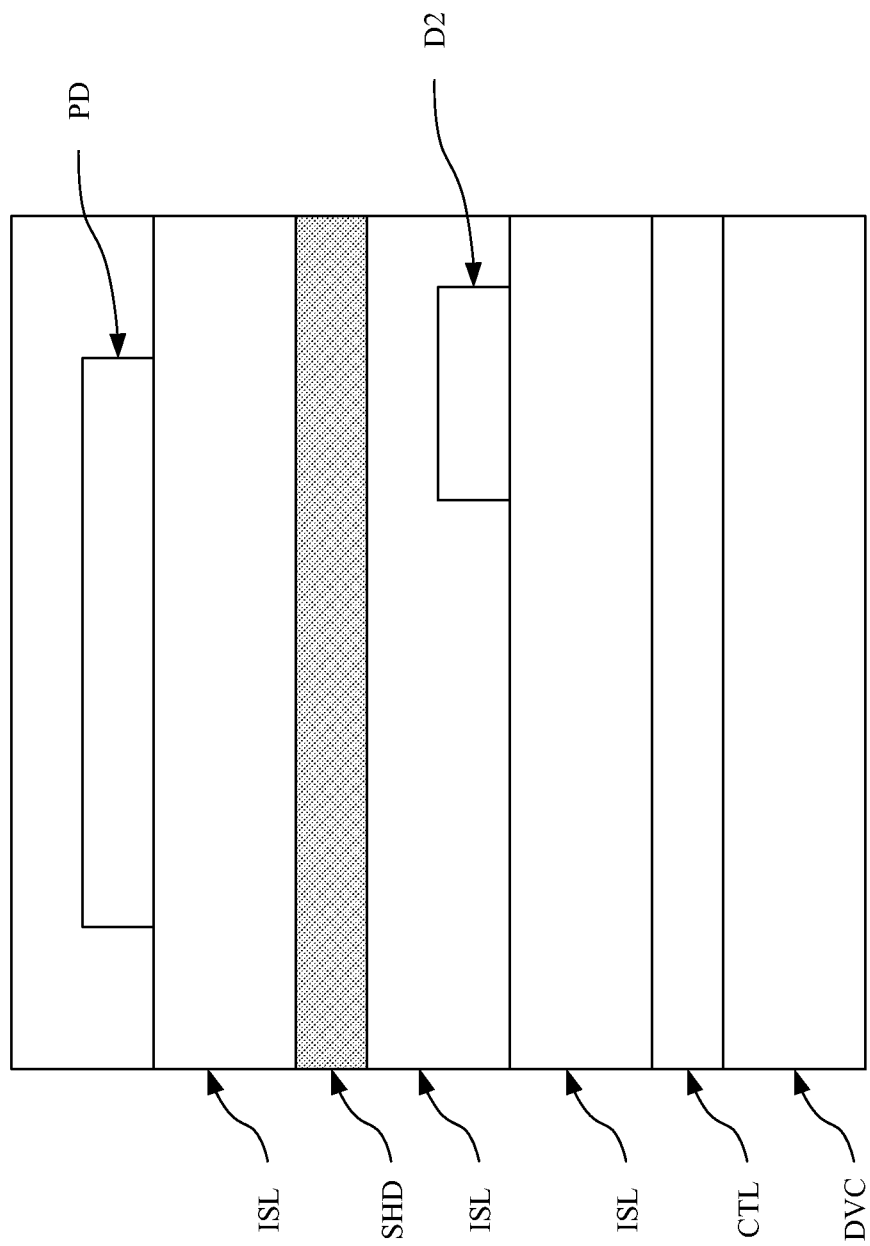
FIG. 1B is a sectional view of a fingerprint sensing device according to one embodiment of the present disclosure.

FIG. 1B is a sectional view of a fingerprint sensing device according to one embodiment of the present disclosure. In one embodiment, the fingerprint sensing device 100 has a shielding layer SHD disposed on a data line DL (e.g., one of the data lines D1-D5) and a signal line CTL (e.g., one of the scan lines GL1-GL5, the scan lines GR1-GR5, and the auxiliary voltage lines R1), and a device layer DVC (e.g., including the transistors in the aforementioned control circuit CTC, and/or other transistor devices). The sensing pad PD is disposed above the shielding layer SHD. That is, the shielding layer SHD is disposed between the sensing pad PD and the data line DL, the signal line CTL, and the device layer DVC to prevent noise on the sensing pad PD from affecting signal transmissions on the data line DL, the signal line CTL, and the device layer DVC.

In one embodiment, the shielding layer SHD may be implemented using a conductor, such as metal or metal oxide, but other noise-shielding materials are also within the scope of the present disclosure. In an embodiment, the sensing pads PD, the shielding layer SHD, and the signal line CTL may be isolated by using an insulating layer ISL, but the present disclosure is not limited in this regard.

Figure 2:
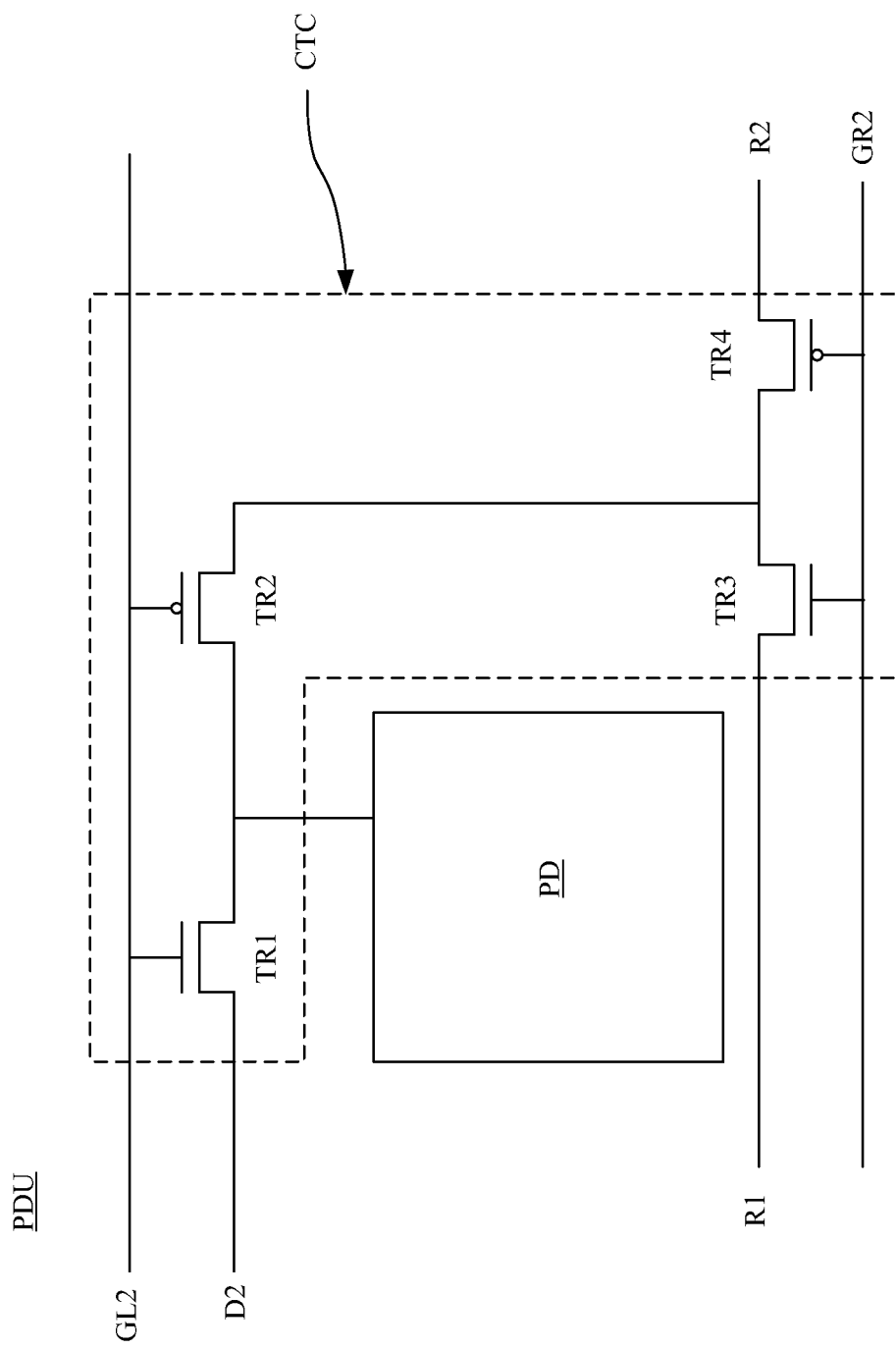
FIG. 2 is a schematic diagram of a control circuit and a sensing pad according to one embodiment of the present disclosure.

FIG. 2 is a schematic diagram of a sensing pad unit PDU according to one embodiment of the present disclosure. In this embodiment, a sensing unit PDU electrically connected to the data line D2, the scan line GL2, and the scan line GR2 is taken as an example. However, another sensing units PDU may also have the same or similar structure and connection relationship described below.

In this embodiment, the sensing unit PDU includes a sensing pad PD and a control circuit CTC. In this embodiment, the control circuit CTC includes switches TR1-TR4.

The switch TR1 is electrically connected between the sensing pad PD and the data line D2, configured for receiving the sensing voltage VS and turning on corresponding to a scan signal SGL2 with a first voltage level (e.g., high voltage level) from the scan line GL2, so as to provide the sensing voltage VS to the sensing pad PD.

A first end of the switch TR2 is electrically connected to the sensing pad PD, and a second end of the switch TR2 is electrically connected between the switches TR3 and TR4. The switch TR2 is configured to turn on corresponding to the scan signal SGL2 with a second voltage level (e.g., low voltage level) from the scan line GL2. In an embodiment, the switches TR1, TR2 may be turned on alternatively.

The switch TR3 is electrically connected between the auxiliary voltage line R1 and the second end of the switch TR2, configured for turning on corresponding to the scan signal SGL2 with the first voltage level (e.g., high voltage level) from the scan line GL2, so as to provide the auxiliary voltage VR1 to the sensing pad PD via the switch TR2.

The switch TR4 is electrically connected between a voltage line R2 and the second end of the switch TR2, configured for turning on corresponding to the scan signal SGR2 with the second voltage level (e.g., low voltage level) from the scan line SGR2, so as to provide an operating voltage VR2 from the voltage line R2 to the sensing pad PD via the switch TR2. In an embodiment, the switches TR3, TR4 may be turned on alternatively.

In an embodiment, the switches TR1, TR3 may be implemented by using N-type transistors, and the switches TR2, TR4 may be implemented by using P-type transistors, but other implementations are also within the scope of the present disclosure.

Figure 3A:
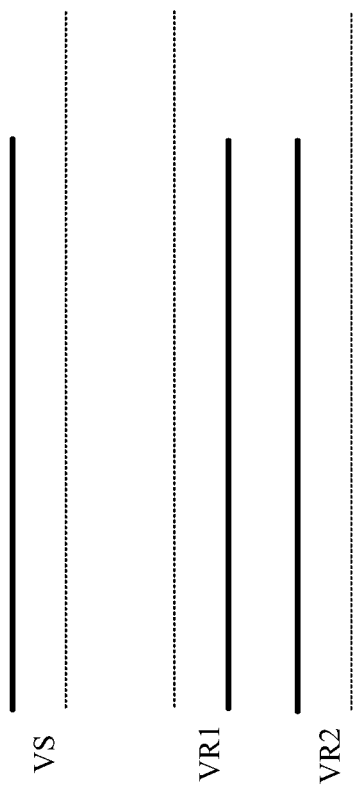
FIG. 3A illustrates different voltages according to one embodiment of the present disclosure.

In one embodiment, the sensing voltage VS, the auxiliary voltage VR1, and the operating voltage VR2 are all DC voltages (see FIG. 3A). In an embodiment, the voltage levels of the sensing voltage VS and the auxiliary voltage VR1 are different from each other. In an embodiment, the voltage levels of the sensing voltage VS and the operating voltage VR2 are the same as each other, but the present disclosure is not limited to such an embodiment. In this embodiment, the operating voltage VR2 may be an AC voltage.

In one embodiment, the sensing voltage VS, the auxiliary voltage VR1, and the operating voltage VR2 are all AC voltages (see FIG. 3B). In an embodiment, the phases of the sensing voltage VS and the auxiliary voltage VR1 are different from each other. In an embodiment, the sensing voltage VS and the auxiliary voltage VR1 are 180 degrees out of phase. In an embodiment, the sensing voltage VS and the operating voltage VR2 are the same as each other, but the present disclosure is not limited in this regard. In this embodiment, the operating voltage VR2 may also be a DC voltage.

Details of the fingerprint sensing device 100 will be described in an operating example below with reference to FIGS. 1A, 2 and 4A, but the present disclosure is not limited to the example below. In the following operating example, the sensing voltage VS and the auxiliary voltage VR1 being 180 degrees out of phase to each other will be taken as an example, but the present disclosure is not limited by such an example.

During period T1, the scan signal SGL1 has a high voltage level, and the scan signals SGL2-SGL5 have low voltage levels. The scan signal SGR2 has a high voltage level, and the scan signals SGR1, SGR3-SGR5 have low voltage levels.

At this time, the switches TR1 in the first row of the sensing units PDU are turned on according to the scan signal SGL1 to provide the sensing voltage VS to corresponding sensing pads PD. The switches TR2 in the first row of the sensing units PDU are turned off according to the scan signal SGL1 to prevent the auxiliary voltage VR1 and the operating voltage VR2 from being supplied to corresponding sensing pads PD.

In addition, the switches TR3 in the first row of the sensing units PDU are turned off according to the scan signal SGR1. The switches TR4 in the first row of the sensing units PDU are turned on according to the scan signal SGR1.

On the other hand, in the period T1, the switches TR1 in the second row of the sensing units PDU are turned off according to the scan signal SGL2. The switches TR2 in the second row of the sensing units PDU are turned on according to the scan signal SGL2. The switches TR3 in the second row of the sensing units PDU are turned on according to the scan signal SGR2 to provide the auxiliary voltage VR1 to corresponding sensing pads PD through the switches TR2. The switches TR4 in the second row of the sensing units PDU are turned off according to the scan signal SGR2 to prevent the operating voltage VR2 from being supplied to corresponding sensing pads PD through the switches TR2.

In the period T1, the switches TR1 in the third row of the sensing units PDU are turned off according to the scan signal SGL3. The switches TR2 in the third row of the sensing units PDU are turned on according to the scan signal SGL3. The switches TR3 in the third row of the sensing units PDU are turned off according to the scan signal SGR4 to prevent the voltage VR1 from being supplied to the sensing pads PD through the switches TR2. The switches TR4 in the third row of the sensing units PDU are turned on according to the scan signal SGR3 to provide the operating voltage VR2 to the sensing pads PD through the switches TR2.

In the period T1, the operations of the fourth and fifth rows of the sensing units PDU are substantially the same as the operations of the third row of the sensing units PDU, and descriptions in this regard will not be repeated herein.

In the period T2, the scan signal SGL2 has a high voltage level, and the scan signals SGL1, SGL3-SGL5 have low voltage levels. The scan signals SGR1, SGR3 have high voltage levels, and the scan signals SGR2, SGR4-SGR5 have low voltage levels.

In the period T2, the switches TR1 in the first row of the sensing units PDU are turned off according to the scan signal SGL1. The switches TR2 in the first row of the sensing units PDU are turned on according to the scan signal SGL1. The switches TR3 in the first row of the sensing units PDU are turned on according to the scan signal SGR1 to provide the auxiliary voltage VR1 to the sensing pads PD through the switches TR2. The switches TR4 in the first row of the sensing units PDU are turned off according to the scan signal SGR1 to prevent the operating voltage VR2 from being supplied to the sensing pads PD through the switches TR2.

In the period T2, the switches TR1 in the second row of the sensing units PDU are turned on according to the scan signal SGL2 to provide the sensing voltage VS to the corresponding sensing pads PD. The switches TR2 in the second row of the sensing units PDU are turned off according to the scan signal SGL2 to prevent the auxiliary voltage VR1 and the operating voltage VR2 from being supplied to the sensing pads PD. The switches TR3 in the second row of the sensing units PDU are turned on according to the scan signal SGR1. The switches TR4 in the second row of the sensing units PDU are turned off according to the scan signal SGR1.

In the period T2, the operations of the third row of the sensing units PDU are substantially the same as the operations of the first row of the sensing units PDU, and descriptions in this regard will not be repeated herein.

In the period T2, the switches TR1 in the fourth row of the sensing units PDU are turned off according to the scan signal SGL4. The switches TR2 in the fourth row of the sensing units PDU are turned on according to the scan signal SGL4. The switches TR3 in the fourth row of the sensing units PDU are turned off according to the scan signal SGR4 to prevent the voltage VR1 from being supplied to the sensing pads PD through the switches TR2. The switches TR4 in the fourth row of the sensing units PDU are turned on according to the scan signal SGR4 to provide the operating voltage VR2 to the corresponding sensing pads PD through the switches TR2.

In the period T2, the operations of the fifth row of the sensing units PDU are substantially the same as the operations of the fourth row of the sensing units PDU, so it will not be repeated herein.

The operation of the sensing unit PDU in the periods T3-T5 may also be analogous to the above and therefore will not be described herein.

Through the above-mentioned operations, a row of sensing pads PD receiving the sensing voltage VS can be adjacent to at least one row of the sensing pads PD receiving the auxiliary voltage VR1. In this way, the sensing voltage VS and the auxiliary voltage VR1 that are different from each other (such as being 180 degrees out of phase or having opposite polarities) can be used to increase the amount of charges stored among the sensing pads PD so as to increase the differences of the amount of the charges stored among the sensing pads PD corresponding to peaks and valleys of fingerprints, and as a result, the sensitivity of fingerprint identification can be increased. More specifically, since amount of the charges=voltage difference*capacitance value, the higher the voltage difference between the sensing voltage VS and the auxiliary voltage VR1, the greater the amount of charges stored among the sensing pads PD, so that the differences of the amount of the charges corresponding to peaks and valleys of fingerprints can be increased, and the sensitivity of fingerprint identification can be increased.

Therefore, even if the shielding layer SHD isolates the sensing pad PD from the data line DL, the signal line CTL, and the device layer DVC, and the stray capacitances coupled to the sensing pad PD is reduced, the sensing pad PD can still be used to store a sufficient amount of charges to allow the sensing circuit DTC to identify peaks and valleys of fingerprints.

Figure 4A:
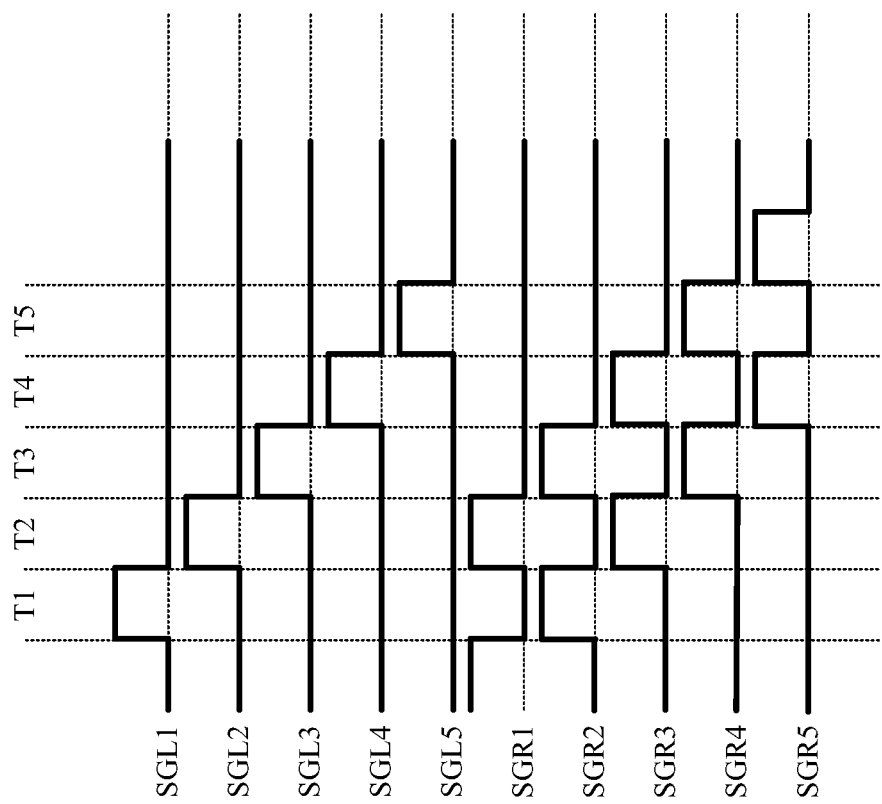
FIG. 4A illustrates an operating example of a scan signal of according to one embodiment of the present disclosure.
Figure 4B:
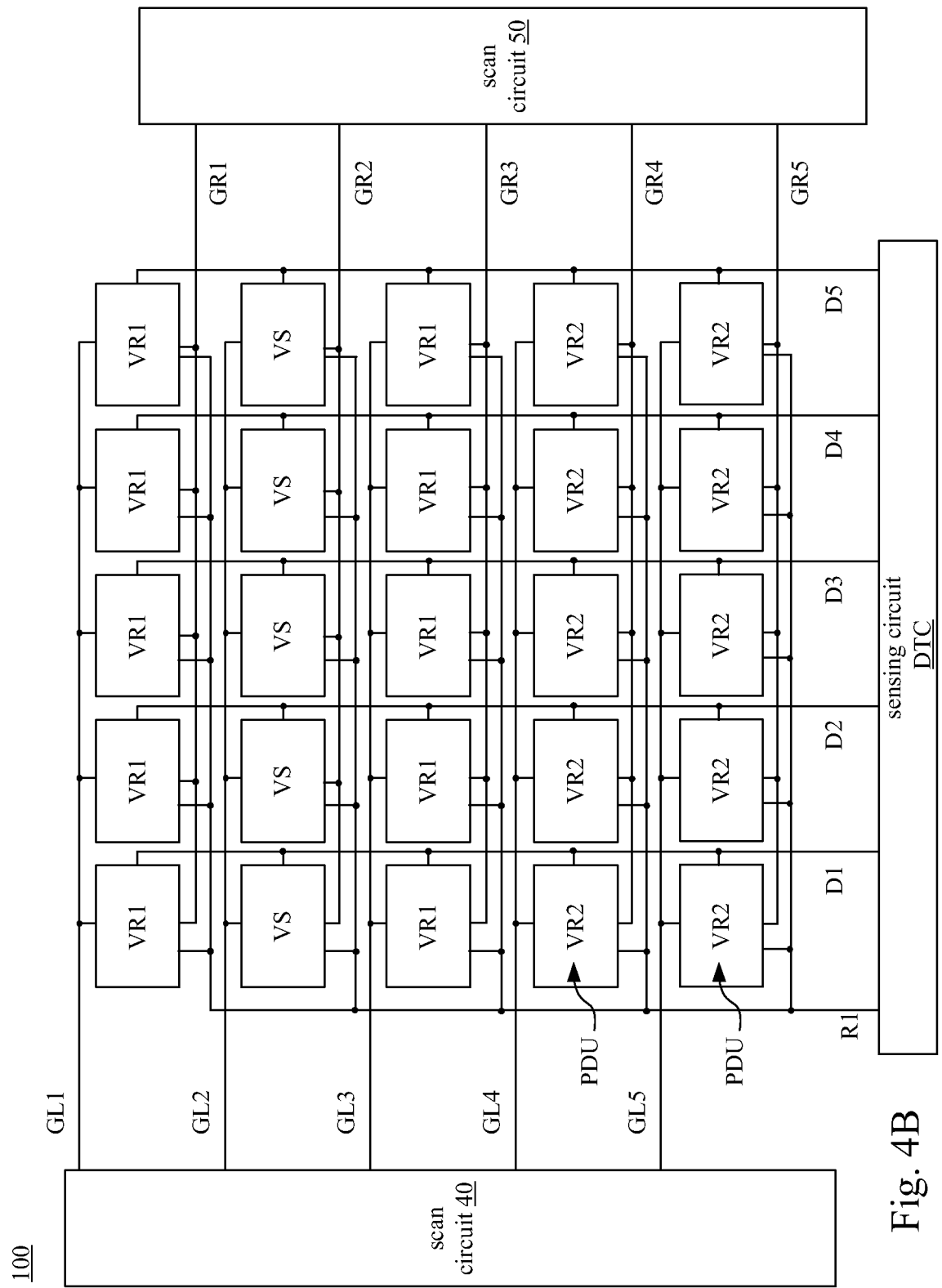
FIG. 4B illustrates an operating example of according to one embodiment of the present disclosure.

FIG. 4B illustrates the voltages on the sensing pads PD of the sensing units PDU in the period T2 in the operating example described above. As shown in the figure, the second row of the sensing pads PD receive the sensing voltage VS, and the first and third rows of the sensing pads PD adjacent to the second row of the sensing pads PD receive the auxiliary voltage VR1, so that the capacitances between the second row of the sensing pads PD and the first and third rows of the sensing pads PD can store more charges.

On the other hand, in different operating examples of the present disclosure, the sensing circuit DTC may also provide the auxiliary voltage VR1 through a portion of the data lines D1-D5 to make the fingerprint sensing device 100 more sensitive.

Figure 4C:
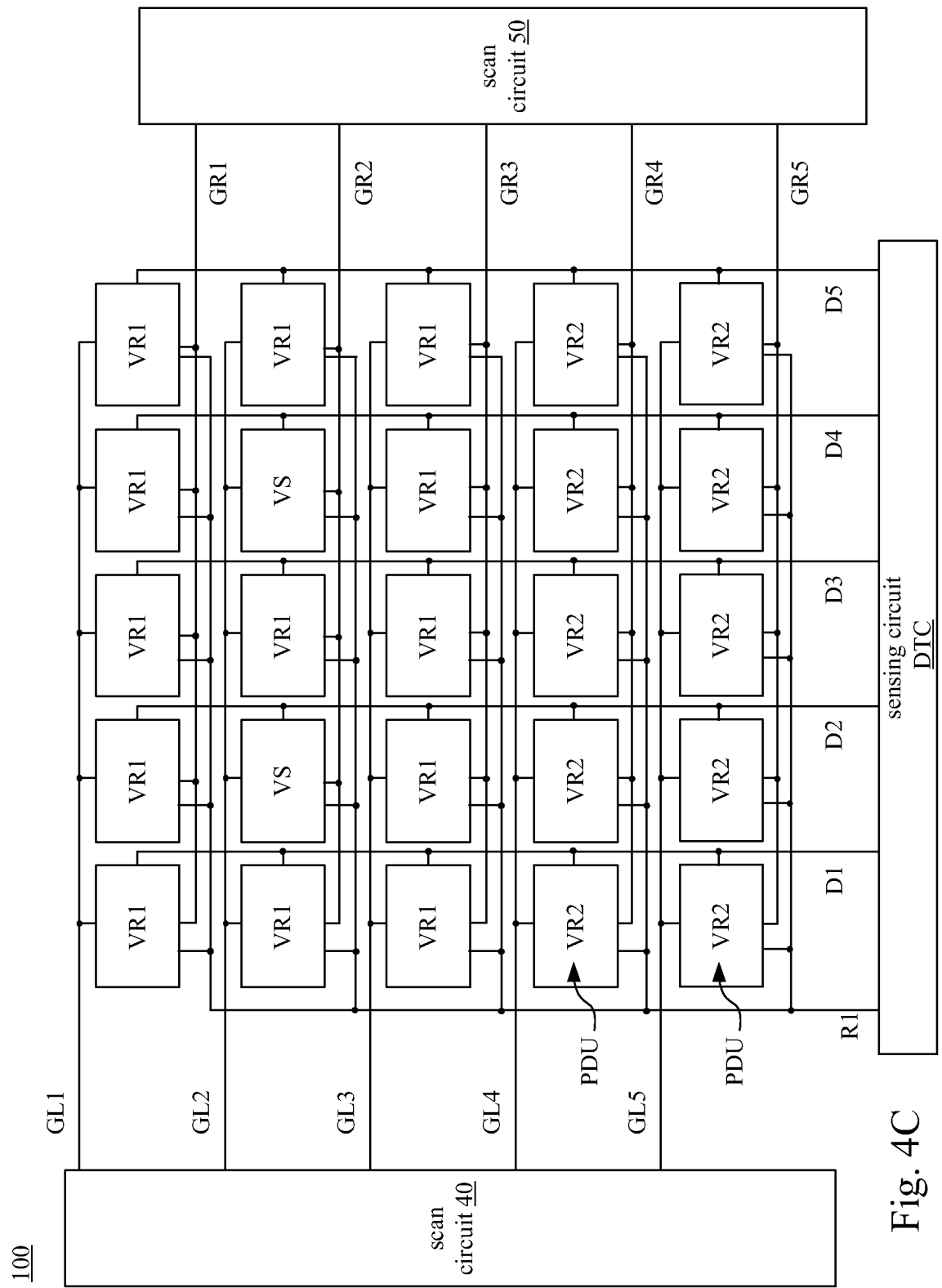
FIG. 4C illustrates an operating example of according to another embodiment of the present disclosure.

For example, refer to FIG. 4C, in this operating example, the scan signals SGL1-SGL5 and the scan signals SGR1-SGR5 of the fingerprint sensing device 100 are similar to the scan signals SGL1-SGL5 and the scan signals SGR1-SGR5 in the embodiment corresponding to FIG. 4A, and many aspects that are similar will not be described herein. In addition, the operations of the fingerprint sensing device 100 in the periods T1-T5 is also similar to the operating example described above, so that many aspect that are similar will not described herein. In this operating example, the sensing circuit DTC provides the auxiliary voltage VR1 to the sensing pads PD through the data lines D1, D3, D5, and provides the sensing voltage VS to the sensing pads PD through the data lines D2, D4.

Through such operations, since the sensing pads PD receiving the sensing voltage VS is surrounded by the sensing pads PD that receives the auxiliary voltage VR1 (see FIG. 4C) (that is, under the condition that one of the sensing pad receives the sensing voltage VS, other sensing pads that surround the one of the sensing pads receive the auxiliary voltage VR1), so that the sensing pad PD receiving the sensing voltage VS can utilize the capacitances between itself and the sensing pad PD that receives the auxiliary voltage VR1 to store more charges, so as to increase the sensitivity of the fingerprint sensing device 100.

It should be noted that in different embodiments, the sensing circuit DTC may provide the auxiliary voltage VR1 to the sensing pad PD through different data lines in different periods. For example, in the period T1, the sensing circuit DTC provides the auxiliary voltage VR1 to the sensing pads PD through the data lines D2, D4, and provides the sensing voltage VS to the sensing pads PD through the data lines D1, D3, D5. In the period T2, the sensing circuit DTC provides the auxiliary voltage VR1 to the sensing pads PD through the data lines D1, D3, D5, and provides the sensing voltage VS to the sensing pads PD through the data lines D2, D4.

Details of the fingerprint sensing device 100 in an operating example will be described below with reference to FIG. 5A, but the present disclosure is not limited by the description below. In this operating example, the scan signals SGL1-SGL5 are similar to the scan signals SGL1-SGL5 in the embodiment corresponding to FIG. 4A, and many aspects that are similar will not be repeated herein. On the other hand, the scan signals SGR1 to SGR5 in this operating example are similar to the scan signals SGR1 to SGR5 in the embodiment corresponding to FIG. 4A, and only the lasting times of the high voltage levels thereof are different. Therefore, many aspects that are similar will not be repeated herein.

In this operating example, in the period T1, the operations of the first, second, fourth, and fifth rows of the sensing units PDU are the same as the corresponding operations in the embodiment shown in FIGS. 4A and 4B, and the operations that are the same will not be described herein. In the period T1, the third row of the sensing units PDU receives the scan signal SGL3 with a low voltage level and the scan signal SGR3 with a high voltage level, so that the operations thereof are similar to the operations of the second row of the sensing units PDU, and that is, the switches TR2, TR3 thereof are turned on to provide the auxiliary voltage VR1 to the corresponding sensing pads PD.

Similarly, in the period T2, the operations of the first, second, third, and fifth rows of the sensing units PDU are the same as the corresponding operations in the embodiment corresponding to FIGS. 4A, 4B, and the operations of the fourth row of the sensing units PDU are similar to the operations of the third row of the sensing units PDU, and that is, the switches TR2, TR3 thereof are turned on to provide the auxiliary voltage VR1 to the corresponding sensing pads PD. Descriptions that are similar will not be repeated herein.

In the period T3, the operations of the second, third, and fourth rows of the sensing units PDU are the same as the corresponding operations in the embodiment corresponding to FIGS. 4A, 4B, and the operations of the first and fifth rows of the sensing units PDU are similar to the operations of the second and fourth rows of the sensing units PDU, and that is, the switches TR2, TR3 thereof are turned on to provide the auxiliary voltage VR1 to the corresponding sensing pads PD. Descriptions that are similar will not be repeated herein.

It should be noted that the above operating example is only for illustration purpose, and the time of the scan signals SGR1-SGR5 maintained at the high voltage levels can be adjusted on a basis of actual requirements. The present disclosure is not limited to the operating example described above.

Figure 5A:
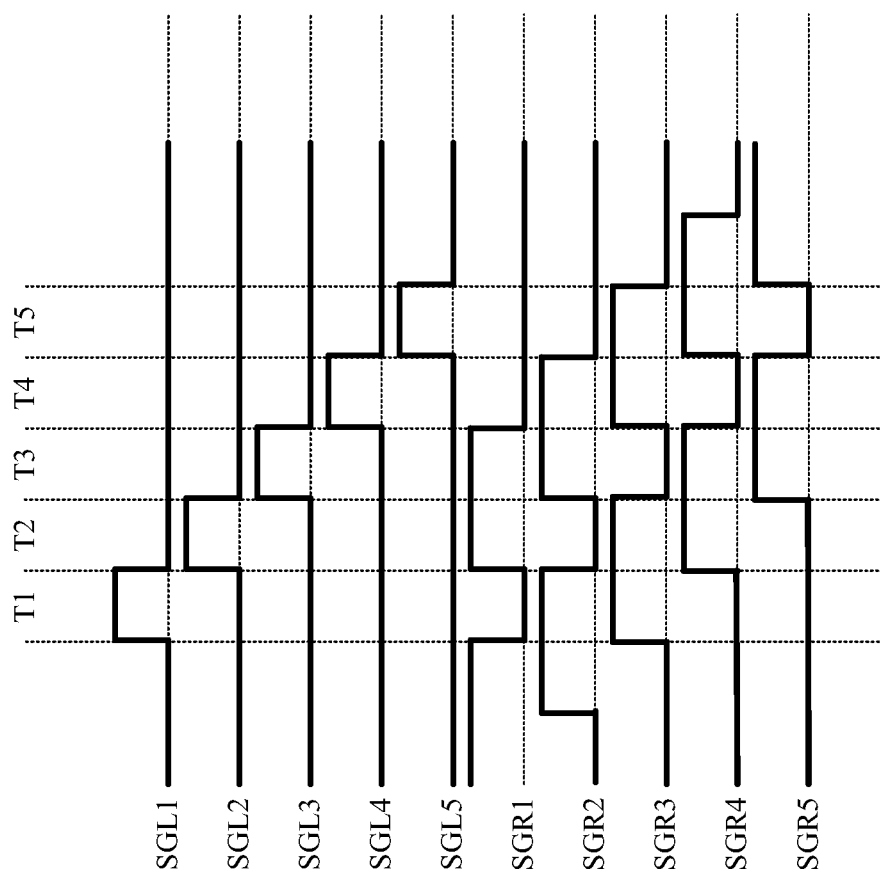
FIG. 5A illustrates an operating example of a scan signal of according to another embodiment of the present disclosure.
Figure 5B:
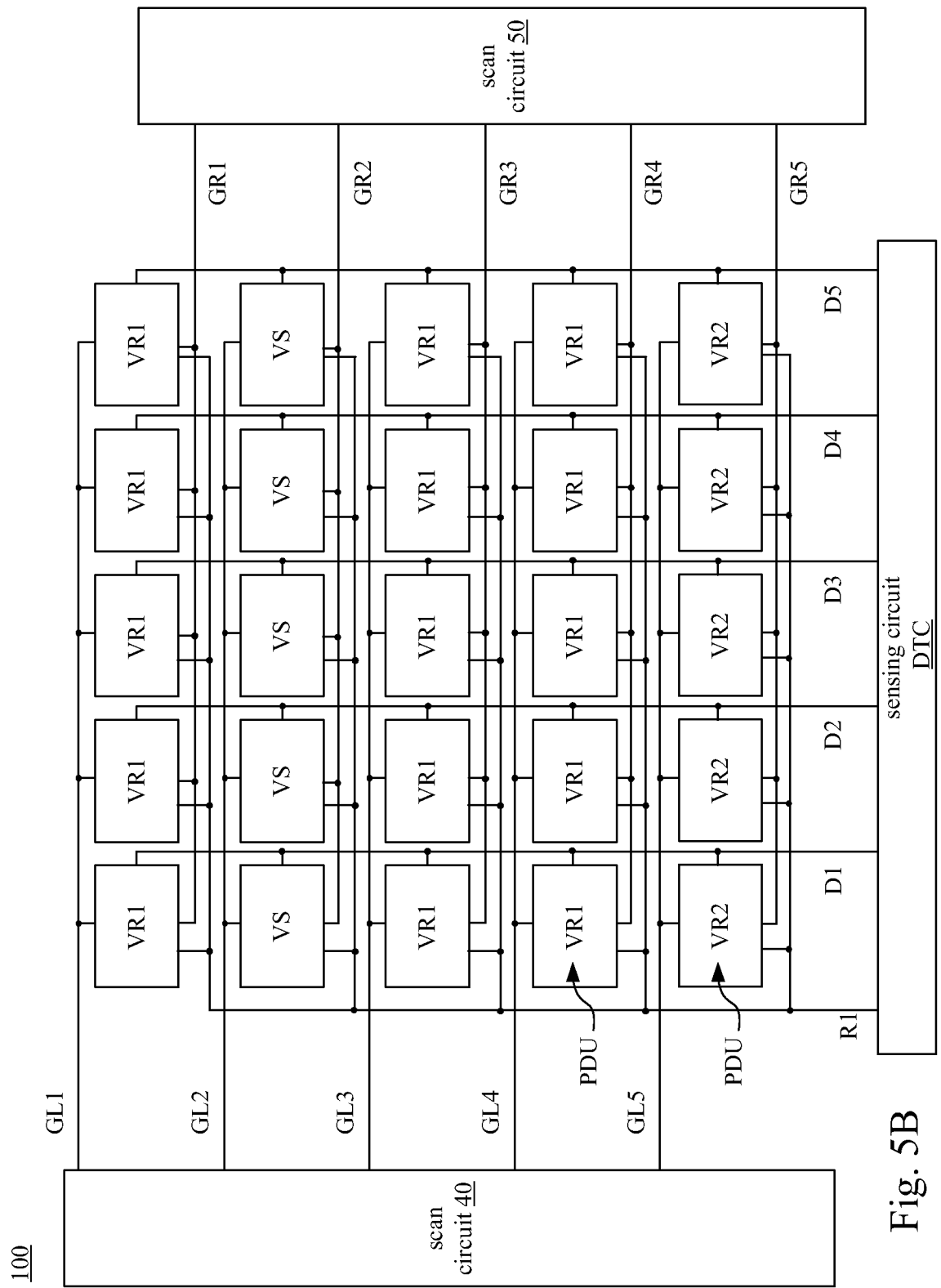
FIG. 5B illustrates an operating example of according to another embodiment of the present disclosure.

FIG. 5B illustrates the voltages on the sensing pads PD of the sensing units PDU in the period T2 in the operating example corresponding to FIG. 5A. As shown in the figure, the second row of sensing pads PD receive the sensing voltage VS, and the first, third and fourth rows of sensing pads PD receive the auxiliary voltage VR1, so as to make the fingerprint sensing device 100 more sensitive.

Figure 6:
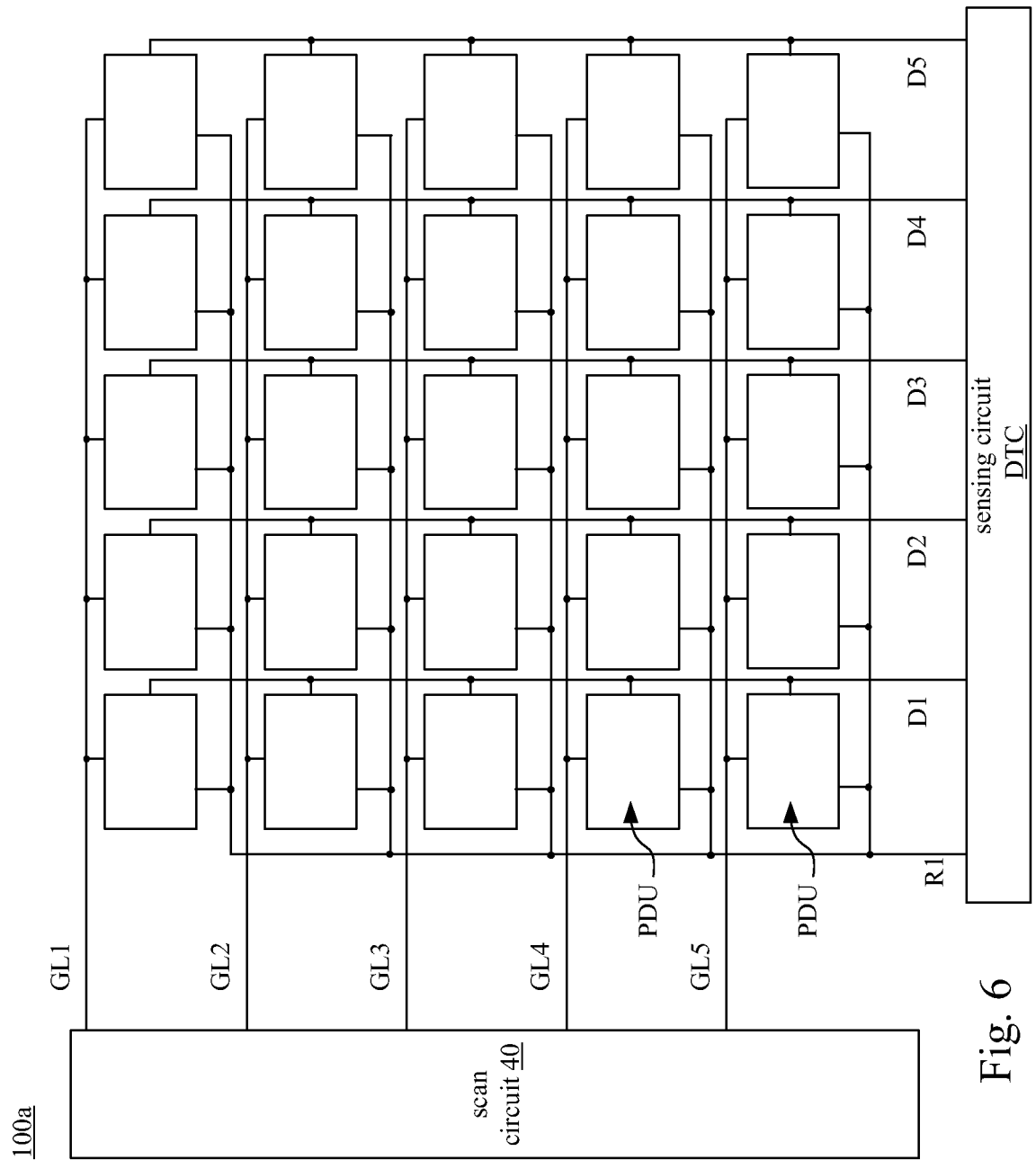
FIG. 6 is a schematic diagram of a fingerprint sensing device according to another embodiment of the present disclosure.

FIG. 6 is a schematic diagram of a fingerprint sensing device 100a according to another embodiment of the present disclosure. In this embodiment, the fingerprint sensing device 100a is similar to the fingerprint sensing device 100 in the embodiment corresponding to FIG. 1, and many aspects that are similar will not be repeated herein. In this embodiment, the scan lines GR1-GR5 are omitted. In an embodiment, the fingerprint sensing device 100a can have two of the scan lines GL1-GL5 electrically connected the same row of the sensing units PDU, so as to serve the scan signals SGL1-SGL5 from one of the two of the scan lines GL1-GL5 as the aforementioned scan signals SGR1-SGR5.

In an embodiment, the scan circuit 40 is electrically connected to a same row of the sensing units PDU through two adjacent ones of the scan lines GL1-GL5 to provide two consecutive ones of the scan signals SGL1-SGL5 to the same row of the sensing units PDU through the two adjacent ones of the scan lines GL1-GL5 respectively, so as to turn on the sensing switches (e.g., the switch TS1 in FIG. 7) and the control switches (e.g., the switch TS3 in FIG. 7) of the row of the sensing units PDU.

In an embodiment, the sensing circuit DTC is electrically connected to the sensing units PDU through the data lines D1-D5 to provide the sensing voltage VS through the data lines D1-D5 to a row of the sensing units PDU with the control switches thereof turning on, and receive the response signals from these sensing units PDU through data lines D1-D5.

In one embodiment, the sensing circuit DTC is also electrically connected to the sensing units PDU through the auxiliary voltage lines R1, and configured to provide the auxiliary voltage VR1 to a row of the sensing units PDU with the control switches thereof turning on through the auxiliary voltage lines R1. In one embodiment, the auxiliary voltage VR1 may be provided to these sensing units PDU through the auxiliary voltage lines R1 by another circuit independent from the sensing circuit DTC.

In an embodiment, the sensing units PDU are arranged in a matrix. Each sensing unit PDU is electrically connected to one of the data lines D1-D5, two adjacent ones of the scan lines GL1-GL5, and one of the auxiliary voltage lines R1. In an embodiment, the sensing unit PDU includes a sensing pad PD and a control circuit (e.g., a control circuit CTC illustrated in FIG. 7). The sensing pads PD of the sensing units PDU are also arranged in a matrix. The control circuit is used to selectively provide different voltages to the sensing pad PD corresponding to the scan signals SGL1-SGL5 for sensing fingerprints. Details on fingerprint sensation of the fingerprint sensing device 100a will be described in the following paragraphs.

Figure 7:
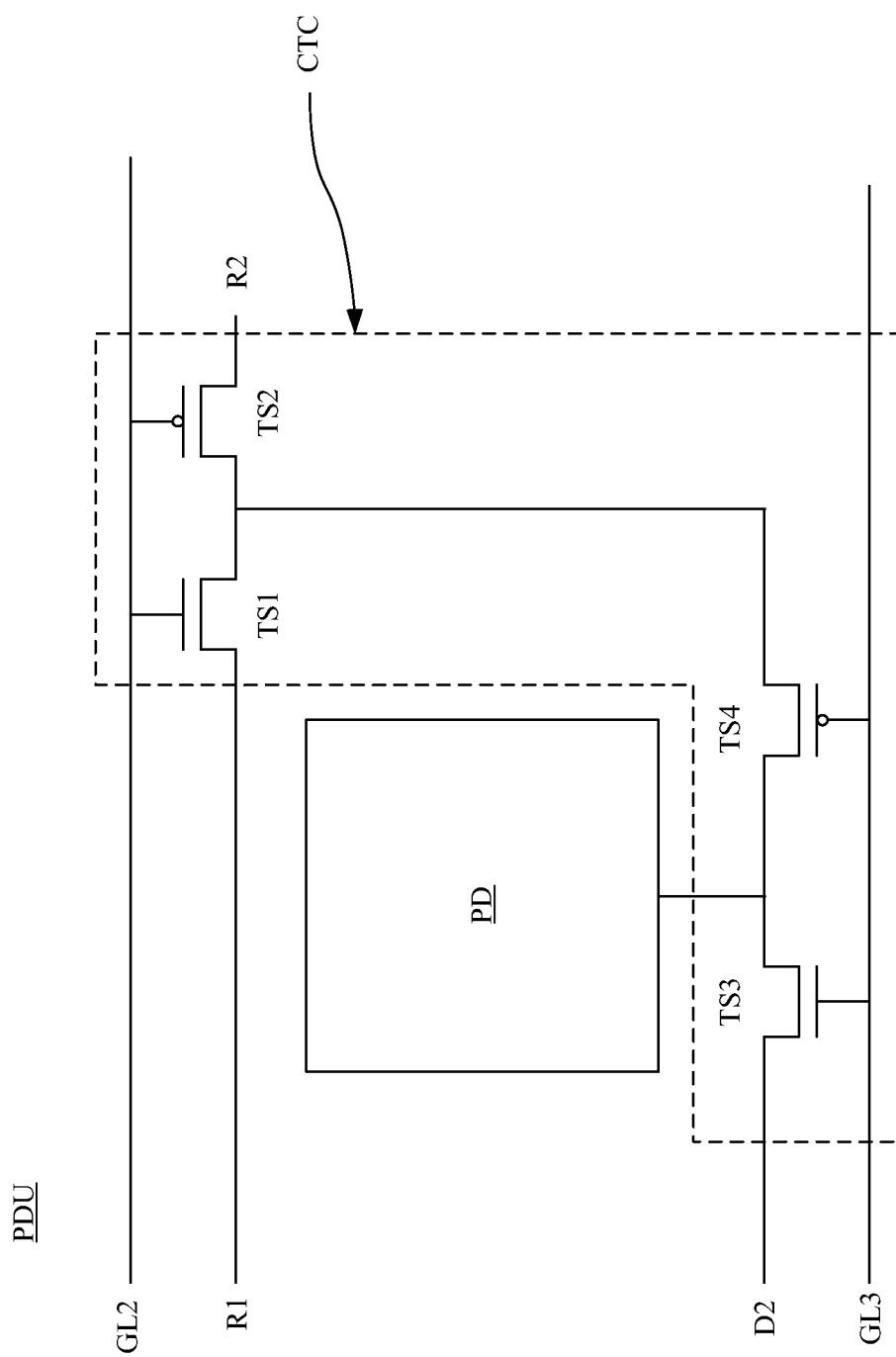
FIG. 7 is a schematic diagram of a control circuit and a sensing pad according to another embodiment of the present disclosure.

FIG. 7 is a schematic diagram of a sensing pad unit PDU according to one embodiment of the present disclosure. In this embodiment, a sensing unit PDU electrically connected to the data line D2 and the scan lines GL2, GL3 is taken as an example. However, other sensing units PDU may also have the same or similar structure and connection relationship.

In this embodiment, the sensing unit PDU includes a sensing pad PD and a control circuit CTC. In this embodiment, the control circuit CTC includes switches TS1-TS4.

The switch TS1 is electrically connected between the auxiliary voltage line R1 and the second end of the switch TS4, configured for turning on corresponding to the scan signal SGL2 with a first voltage level (e.g., high voltage level) from the scan line GL2, so as to provide the auxiliary voltage VR1 to the sensing pad PD via the switch TS4.

The switch TS2 is electrically connected between a voltage line R2 and the second end of the switch TS1, configured for turning on corresponding to the scan signal SGL2 with a second voltage level (e.g., low voltage level) from the scan line SGL2, so as to provide an operating voltage VR2 from the voltage line R2 to the sensing pad PD via the switch TS4. In an embodiment, the switches TS1, TS2 may be turned on alternatively.

The switch TS3 is electrically connected between the sensing pad PD and the data line D2, configured for receiving the sensing voltage VS and turning on corresponding to a scan signal SGL3 with a first voltage level (e.g., high voltage level) from the scan line GL3, so as to provide the sensing voltage VS to the sensing pad PD.

A first end of the switch TS4 is electrically connected to the sensing pad PD, and a second end of the switch TS4 is electrically connected between the switches TS1 and TS2. The switch TS4 is configured to turn on corresponding to the scan signal SGL3 with the second voltage level (e.g., low voltage level) from the scan line GL3. In an embodiment, the switches TS3, TS4 may be turned on alternatively.

In an embodiment, the switches TS1, TS3 may be implemented by using N-type transistors, and the switches TS2, TS4 may be implemented by using P-type transistors, but other implementations are also within the scope of the present disclosure.

Details of the fingerprint sensing device 100a will be described in in an operating example below with reference to FIG. 8, but the present disclosure is not limited by the example below. In the following operating example, the sensing voltage VS and the auxiliary voltage VR1 are 180 degrees out of phase to each other, but the present disclosure is not limited by such an example.

During period T1, the scan signal SGL1 has a high voltage level, and the scan signals SGL2-SGL5 have low voltage levels. At this time, the switches TS3 in the first row of the sensing units PDU are turned off according to the scan signal SGL2. The switches TS4 in the first row of the sensing units PDU are turned on according to the scan signal SGL2. The switches TS1 in the first row of the sensing units PDU are turned on according to the scan signal SGL1 to provide the auxiliary voltage VR1 to corresponding sensing pads PD. The switches TS2 in the first row of the sensing units PDU are turned off according to the scan signal SGL1.

On the other hand, in the period T1, the switches TS3 in the second row of the sensing units PDU are turned off according to the scan signal SGL3. The switches TS4 in the second row of the sensing units PDU are turned on according to the scan signal SGL3. The switches TS1 in the second row of the sensing units PDU are turned off according to the scan signal SGL2. The switches TS2 in the second row of the sensing units PDU are turned on according to the scan signal SGL2 to provide the auxiliary voltage VR2 to corresponding sensing pads PD through the switches TS4.

In the period T1, the operations of the third, fourth and fifth rows of the sensing units PDU are substantially the same as the operations of the second row of the sensing units PDU, and descriptions in this regard will not be repeated herein.

In the period T2, the scan signal SGL2 has a high voltage level, and the scan signals SGL1, SGL3-SGL5 low voltage levels. At this time, the switches TS3 in the first row of the sensing units PDU are turned on according to the scan signal SGL2 to provide the sensing voltage to corresponding sensing pads PD. The switches TS4 in the first row of the sensing units PDU are turned off according to the scan signal SGL2, to prevent the voltages VR1, VR2 from being supplied to the sensing pad PD through the switch TS4. The switches TS1 in the first row of the sensing units PDU are turned off according to the scan signal SGL1. The switches TS2 in the first row of the sensing units PDU are turned on according to the scan signal SGL1.

On the other hand, the switches TS3 in the second row of the sensing units PDU are turned off according to the scan signal SGL3. The switches TS4 in the second row of the sensing units PDU are turned on according to the scan signal SGL3. The switches TS1 in the second row of the sensing units PDU are turned on according to the scan signal SGL2 to provide the auxiliary voltage VR1 to corresponding sensing pads PD through the switches TS4. The switches TS2 in the second row of the sensing units PDU are turned off according to the scan signal SGL2.

On the other hand, in the period T2, the switches TS3 in the third row of the sensing units PDU are turned off according to the scan signal SGL4. The switches TS4 in the third row of the sensing units PDU are turned on according to the scan signal SGL4. The switches TS1 in the third row of the sensing units PDU are turned off according to the scan signal SGL3. The switches TS2 in the third row of the sensing units PDU are turned on according to the scan signal SGL3 to provide the auxiliary voltage VR2 to corresponding sensing pads PD through the switches TS4.

In the period T2, the operations of the fourth and fifth rows of the sensing units PDU are substantially the same as the operations of the third row of the sensing units PDU, and descriptions in this regard will not be repeated herein.

Through the above-mentioned operations, a row of sensing pads PD receiving the sensing voltage VS can be adjacent to at least one row of the sensing pads PD receiving the auxiliary voltage VR1.

Through the above-mentioned operations, a row of sensing pads PD receiving the sensing voltage VS can be adjacent to at least one row of the sensing pads PD receiving the auxiliary voltage VR1. In this way, the sensing voltage VS and the auxiliary voltage VR1 that are different from each other (such as being 180 degrees out of phase or having opposite polarities) can be used to increase the amount of charges stored among the sensing pads PD so as to increase the differences of the amount of the charges stored among the sensing pads PD corresponding to peaks and valleys of fingerprints, and as a result, the sensitivity of fingerprint identification can be increased.

In such a way, even if the shielding layer SHD isolates the sensing pad PD from the data line DL, the signal line CTL, and the device layer DVC, so that the stray capacitances coupled to the sensing pad PD is reduced, the sensing pad PD can still store a sufficient amount of charges to allow the sensing circuit DTC to identify peaks and valleys of fingerprints.

Figure 8:
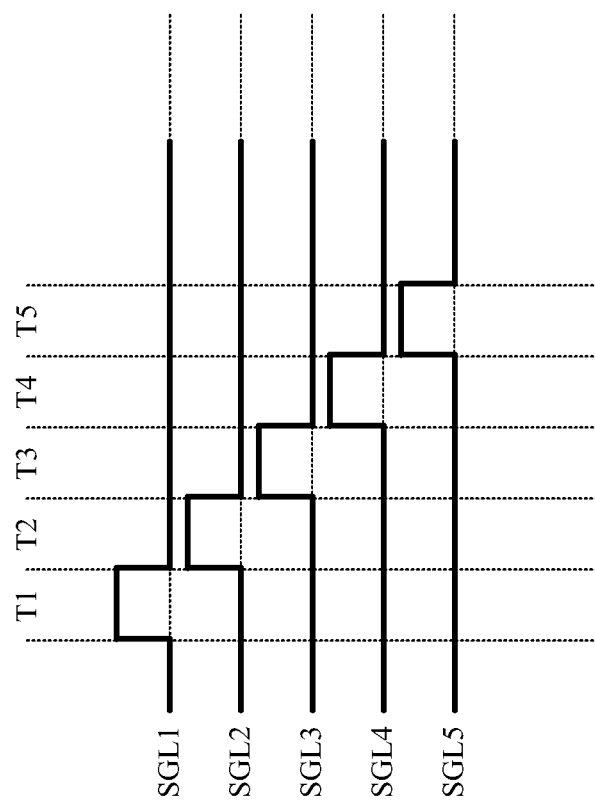
FIG. 8 illustrates an operating example of a scan signal of according to another embodiment of the present disclosure.
Figure 9:
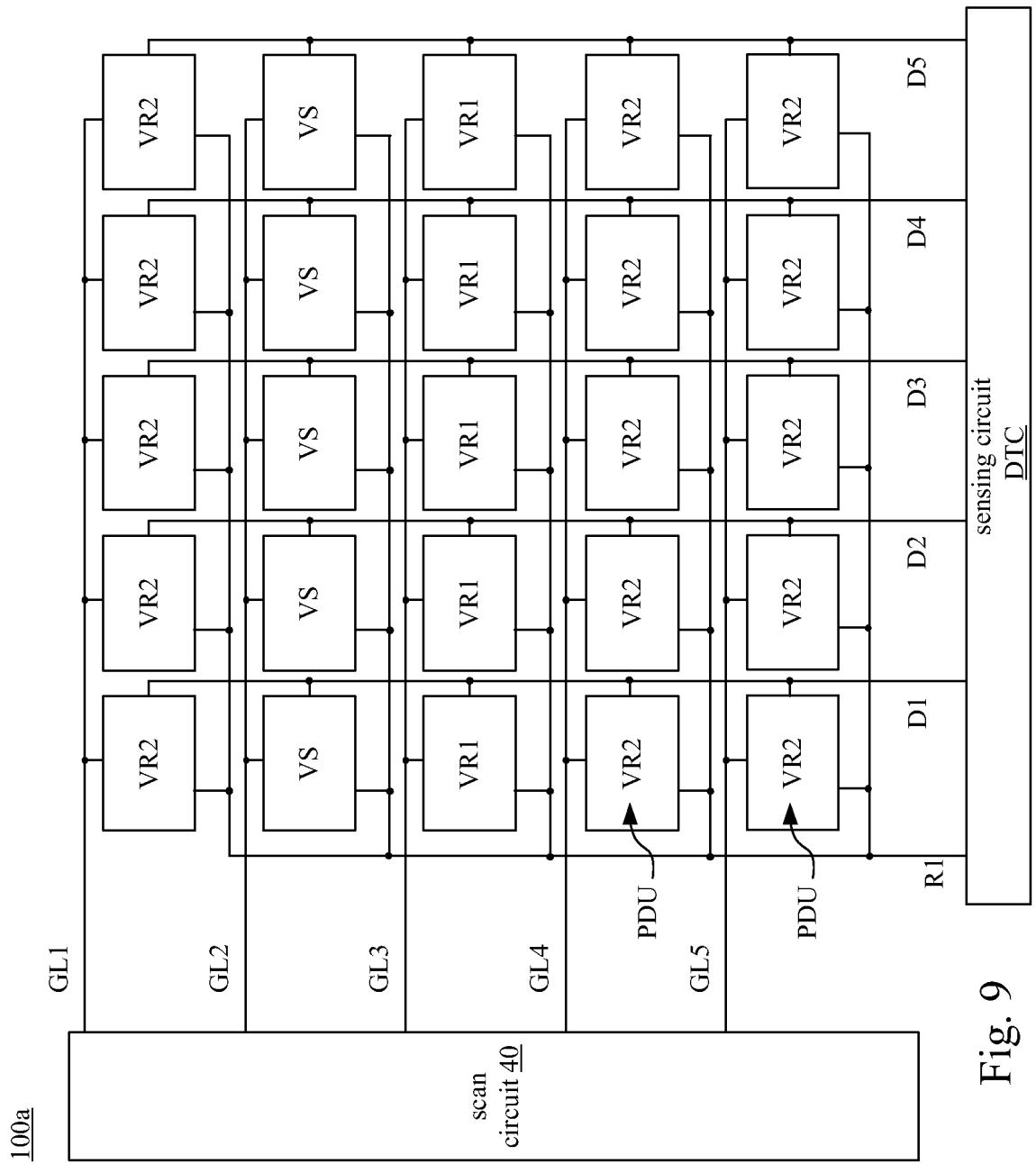
FIG. 9 illustrates an operating example of according to another embodiment of the present disclosure.

FIG. 9 illustrates the voltages on the sensing pads PD of the sensing units PDU in the period T3 in the operating example corresponding to FIG. 8. As shown in the figure, the sensing pads PD in the second row of sensing pads PD receive the sensing voltage VS, and the sensing pads PD in third row of sensing pads PD receive the auxiliary voltage VR1, so as to allow the capacitances among the second row of sensing pads PD and the third row of sensing pads PD store more charges.

Figure 10:
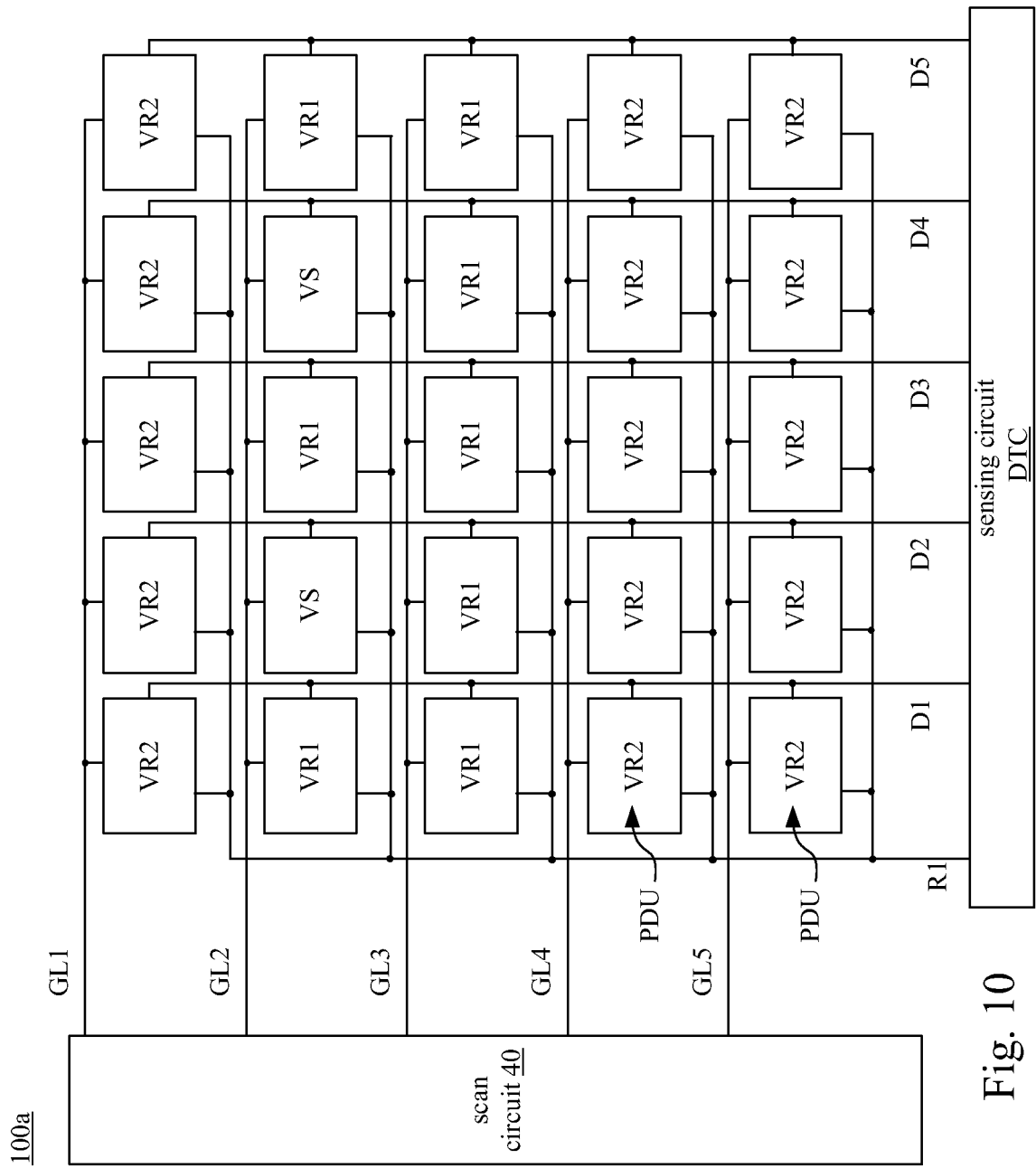
FIG. 10 illustrates an operating example of according to another embodiment of the present disclosure.

On the other hand, it should be noted that, similar to the fingerprint sensing device 100, the fingerprint sensing device 100a can also provide the auxiliary voltage VR1 via a part of the data lines D1-D5, so as to increase the sensitivity of the fingerprint sensing device 100a (see FIG. 10). Many aspects in this regard can be ascertained by referring to the paragraphs above, and will not be described herein.

Although the present disclosure has been described in considerable detail with reference to certain embodiments thereof, other embodiments are possible. Therefore, the scope of the appended claims should not be limited to the description of the embodiments contained herein.

What is claimed is:
1. A fingerprint sensing device comprising:
a plurality of sensing pads arranged in an array, wherein the sensing pads comprise a first sensing pad and a second sensing pad adjacent to each other;
a plurality of data lines respectively and electrically connected to the sensing pads, and configured to provide a sensing voltage to the sensing pads;
a shielding layer disposed between the sensing pads and the data lines;
a plurality of auxiliary voltage lines respectively and electrically connected to the sensing pads and configured to provide an auxiliary voltage to the sensing pads, wherein the auxiliary voltage and the sensing voltage are different from each other;
wherein under a condition that the first sensing pad receives the sensing voltage, the second sensing pad receives the auxiliary voltage; and
a plurality of control circuits arranged in an array, electrically and respectively connected to the sensing pads, configured for providing the sensing voltage to the sensing pads according to a plurality of first scan signals, and providing the auxiliary voltage to the sensing pads according to a plurality of second scan signals,
wherein when the control circuits provide the sensing voltage to the first sensing pad, the control circuits refrain from providing the auxiliary voltage to the first sensing pad;
wherein the control circuits comprises:
a first switch configured for turning on corresponding to one of the first scan signals to provide the sensing voltage to the first sensing pad;
a second switch configured for turning on corresponding to the one of the first scan signals, wherein the first switch and the second switch are alternately turned on;
a third switch configured for turning on corresponding to one of the second scan signals to provide the auxiliary voltage to the first sensing pad through the second switch; and a fourth switch configured for turning on corresponding the one of the second scan signals to provide an operating voltage to the first sensing pad through the second switch, wherein the third switch and the fourth switch are alternately turned on.

2. The fingerprint sensing device as claimed in claim 1, wherein the phases of the auxiliary voltage and the sensing voltage are partially different from each other, the auxiliary voltage and the sensing voltage are 180 degrees out of phase, or the voltage levels of the auxiliary voltage and the sensing voltage are different from each other.

3. The fingerprint sensing device as claimed in claim 1, further comprising:
a plurality of first scan lines respectively and electrically connected to the control circuits configured for providing the first scan signals to the control circuits;
a plurality of control lines respectively and electrically connected to the control circuits configured for providing the second scan signals to the control circuits.

4. The fingerprint sensing device as claimed in claim 1, further comprising:
a plurality of scan lines configured for providing the first scan signals to the control circuits;
wherein a row of the control circuits is electrically connected to two adjacent ones of the scan lines, so as to take the first scan signal from one of the two adjacent ones of the scan lines as one of the second scan signals.

5. The fingerprint sensing device as claimed in claim 1, wherein the operating voltage is the same as the sensing voltage.

6. The fingerprint sensing device as claimed in claim 1, wherein concurrent with the sensing voltage being provided to the first sensing pad according to one of the first scan signals, the auxiliary voltage is provided to the second sensing pad according to the one of the first scan signals.

7. The fingerprint sensing device as claimed in claim 1, wherein under a condition that a first row of the sensing pads receive the sensing voltage, a second row of the sensing pads adjacent to the first row of the sensing pads receive the auxiliary voltage.

8. The fingerprint sensing device as claimed in claim 1, wherein under a condition that a first row of the sensing pads receive the sensing voltage, a second row of the sensing pads adjacent to the first row of the sensing pads and a third row of the sensing pads adjacent to the first row of the sensing pads receive the auxiliary voltage.

9. The fingerprint sensing device as claimed in claim 1, wherein under a condition that a first row of the sensing pads receive the sensing voltage, a second row of the sensing pads adjacent to the first row of the sensing pads and a third row of the sensing pads adjacent to the second row of the sensing pads receive the auxiliary voltage.

10. The fingerprint sensing device as claimed in claim 1, wherein under a condition that the first sensing pad receives the sensing voltage, a portion of the sensing pads surrounding the first sensing pad receive the auxiliary voltage.

11. The fingerprint sensing device as claimed in claim 1, wherein the data lines are further configured to provide the auxiliary voltage to the sensing pads.

12. The fingerprint sensing device as claimed in claim 1, wherein the auxiliary voltage lines are connected to each other.

13. A fingerprint sensing device comprising:
a plurality of sensing pads arranged in an array; and
a plurality of control circuits arranged in an array and electrically connected to the sensing pads respectively, wherein one of the control circuits comprises:
a first switch electrically connected to a first sensing pad of the sensing pads, the first switch configured for receiving a sensing voltage and turning on corresponding to a first scan signal to provide the sensing voltage to the first sensing pad;
a second switch electrically connected to the first sensing pad, the second switch configured for turning on corresponding to the first scan signal, wherein the first switch and the second switch are alternately turned on;
a third switch electrically connected to the second switch, the third switch configured for receiving an auxiliary voltage and turning on corresponding to a second scan signal to provide the auxiliary voltage to the first sensing pad through the second switch; and
a fourth switch configured for turning on corresponding to the second scan signal to provide an operating voltage to the first sensing pad through the second switch, wherein the third switch and the fourth switch are alternately turned on.

14. The fingerprint sensing device as claimed in claim 13, further comprising:
a plurality of gate lines, wherein a first gate line of the gate lines configured for providing the first scan signal is electrically connected to a control end of the first switch and a control end of the second switch; and
a plurality of control lines, wherein a first control line of the control lines configured for providing the second scan signal is electrically connected to a control end of the third switch and a control end of the fourth switch.

15. The fingerprint sensing device as claimed in claim 13, further comprising:
a plurality of gate lines, wherein a first gate line of the gate lines configured for providing the first scan signal is electrically connected to a control end of the first switch and a control end of the second switch;
wherein a second gate line of the gate lines adjacent to the first gate line is electrically connected to a control end of the third switch and a control end of the fourth switch.

16. The fingerprint sensing device as claimed in claim 13, further comprising:
a plurality of data lines respectively and electrically connected to the sensing pads, wherein a first data line of the data lines configured for providing the sensing voltage to the first sensing pad is electrically connected to the first switch; and
a plurality of auxiliary voltage lines respectively and electrically connected to the sensing pads, wherein one of the auxiliary voltage lines configured for providing the auxiliary voltage to the first sensing pad is electrically connected to the third switch, and wherein the auxiliary voltage lines are electrically connected to each other.

17. The fingerprint sensing device as claimed in claim 13, wherein in a first period, the first switch is turned on to provide the sensing voltage to the first sensing pad, and the second switch is turned off to prevent the operating voltage from being provided to the first sensing pad through the fourth switch.

18. The fingerprint sensing device as claimed in claim 17, wherein during a second period, the first switch is turned off, the second switch is turned on, and the third switch is turned on, so that the auxiliary voltage is provided to the first sensing pad through the second switch.

* * * * *